United States Patent
Odaira

(10) Patent No.: US 10,237,433 B2
(45) Date of Patent: Mar. 19, 2019

(54) INFORMATION PROCESSING APPARATUS, METHOD OF CONTROLLING THE SAME, AND STORAGE MEDIUM FOR SPECIFYING A SETTING VALUE TO BE REST AND RESETTING THE SETTING VALUE AFTER INITIALIZATION

(71) Applicant: CANON KABUSHIKI KAISHA, Tokyo (JP)

(72) Inventor: Masahiro Odaira, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/274,160

(22) Filed: Sep. 23, 2016

(65) Prior Publication Data

US 2017/0099406 A1     Apr. 6, 2017

(30) Foreign Application Priority Data

Oct. 6, 2015    (JP) ................................. 2015-198796

(51) Int. Cl.
     *G06F 3/12*      (2006.01)
     *H04N 1/00*      (2006.01)

(52) U.S. Cl.
CPC ....... *H04N 1/00912* (2013.01); *G06F 3/1205* (2013.01); *G06F 3/1236* (2013.01); *H04N 1/00477* (2013.01); *H04N 1/00925* (2013.01); *H04N 2201/0091* (2013.01); *H04N 2201/0093* (2013.01)

(58) Field of Classification Search
None
See application file for complete search history.

(56) References Cited

U.S. PATENT DOCUMENTS

| 7,889,379 | B2 | 2/2011 | Okayama et al. | |
| 8,874,155 | B2 | 10/2014 | Shokawa | |
| 2005/0223324 | A1* | 10/2005 | Tashiro | G03G 15/5016 |
| | | | | 715/273 |
| 2007/0016423 | A1* | 1/2007 | Aizawa | G06F 3/16 |
| | | | | 704/260 |
| 2007/0118383 | A1* | 5/2007 | Fukada | G10L 13/00 |
| | | | | 704/275 |
| 2012/0021789 | A1 | 1/2012 | Shokawa | |

(Continued)

FOREIGN PATENT DOCUMENTS

| CN | 103220447 A | 7/2013 |
| CN | 104902339 A | 9/2015 |

(Continued)

OTHER PUBLICATIONS

Chinese Office Action issued in corresponding Chinese Application No. 201610860507.3 dated Jun. 1, 2018.

Primary Examiner — Henok Shiferaw
(74) Attorney, Agent, or Firm — Venable LLP

(57) ABSTRACT

The present invention provides an information processing apparatus that operates based on setting values of items and a method of controlling the same. When any one of a plurality of items corresponding to initialized setting values includes a predetermined item, the information processing apparatus performs guidance for setting a setting value of the predetermined item in order to reset the setting value of the predetermined item, so that a user can reset the setting value.

16 Claims, 11 Drawing Sheets

(56) References Cited

U.S. PATENT DOCUMENTS

| | | | | |
|---|---|---|---|---|
| 2013/0091338 A1* | 4/2013 | Iwasaki | ............... | G06F 12/0246 |
| | | | | 711/203 |
| 2013/0198671 A1* | 8/2013 | Kasai | ...................... | G06F 9/453 |
| | | | | 715/771 |
| 2015/0288836 A1* | 10/2015 | Kanki | ................ | H04N 1/00514 |
| | | | | 358/1.13 |
| 2016/0147426 A1* | 5/2016 | Urasawa | ............. | G06F 3/04847 |
| | | | | 715/771 |

FOREIGN PATENT DOCUMENTS

| | | | |
|---|---|---|---|
| CN | 104917919 | A | 9/2015 |
| JP | 2006-345085 | A | 12/2006 |
| JP | 5229388 | B2 | 7/2013 |
| WO | 2010/137227 | A1 | 12/2010 |

* cited by examiner

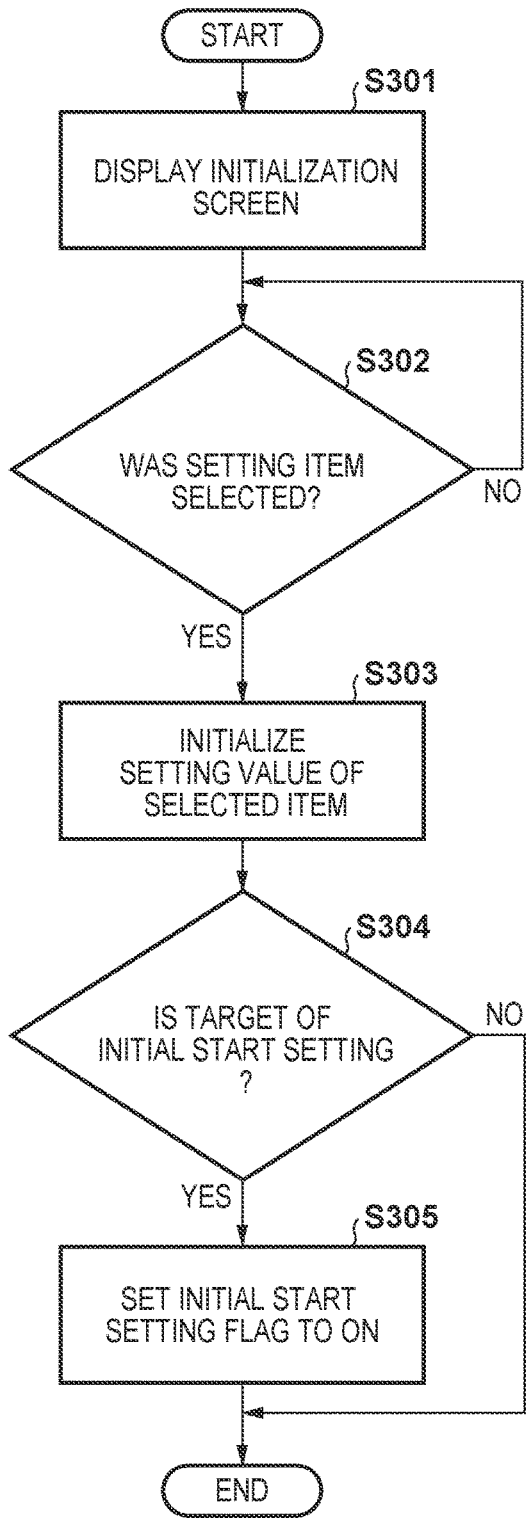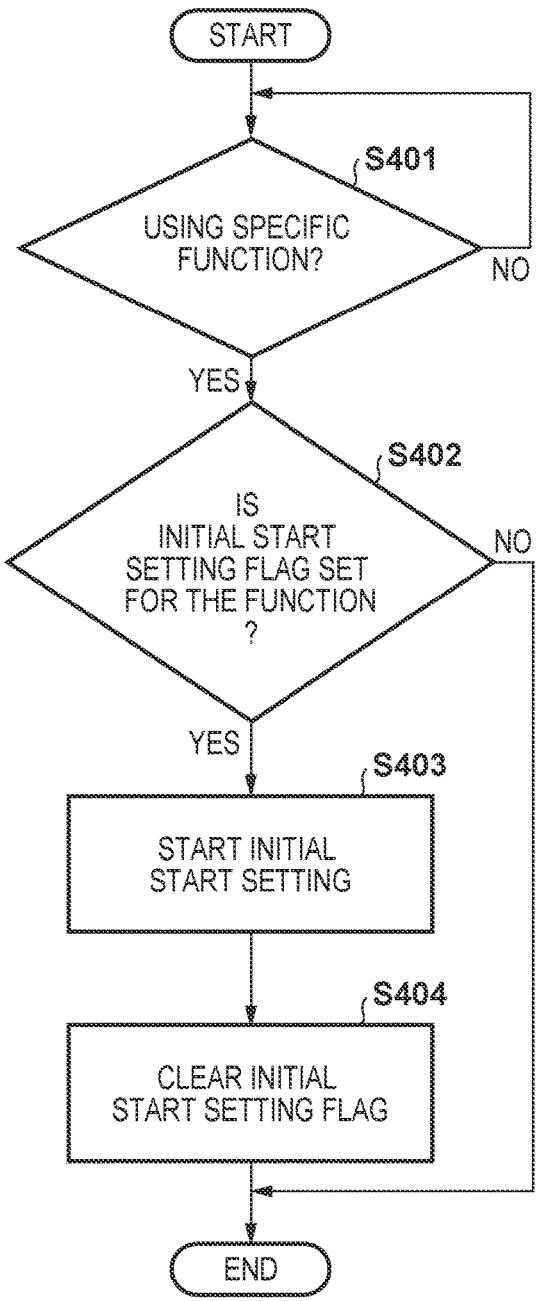

FIG. 13

| MENU CATEGORY | ITEM | INITIAL START SETTING TARGET |
|---|---|---|
| ——— | ——— | ——— |
| CONFIGURATION | SCREEN LUMINANCE ADJUSTMENT | ——— |
| | LANGUAGE SELECTION | ○ |
| | DEFAULT SCREEN SETTING | ——— |
| | ——— | ——— |
| ——— | ——— | ——— |
| FACSIMILE SETTING | AUTOMATIC REDIAL | ——— |
| | USER TELEPHONE NUMBER | ○ |
| | RECEPTION MODE SELECTION | ○ |
| | SOURCE RECORD | ——— |
| | ——— | ——— |
| ——— | ——— | ——— |
| SYSTEM MANAGEMENT SETTING | PROXY SETTING | ——— |
| | WIRELESS LAN SETTING | ○ |
| | ——— | ——— |
| ——— | ——— | ——— |

INFORMATION PROCESSING APPARATUS, METHOD OF CONTROLLING THE SAME, AND STORAGE MEDIUM FOR SPECIFYING A SETTING VALUE TO BE REST AND RESETTING THE SETTING VALUE AFTER INITIALIZATION

BACKGROUND OF THE INVENTION

Field of the Invention

The present invention relates to an information processing apparatus, a method of controlling the same, and a storage medium.

Description of the Related Art

In a case of causing a desired operation to be executed in an information processing apparatus such as an image forming apparatus, at a time of installing an apparatus there is a need to perform in advance a setting relating to the apparatus for a network or the like or a setting relating to a function desired to be used such as a facsimile. To perform these initial settings at the time of installation of an apparatus, knowledge relating to the network, facsimile or the like is required, and in particular it is difficult for a general user to perform an initial setting for an image forming apparatus or the like that has an increase in the sophistication of functions.

Japanese Patent No. 5229388 discloses a technique of, at a time of initial start of a base station, achieving an initial setting of the base station without a special operation by a user, by automatically obtaining necessary setting information from a server. In addition, Japanese Patent Laid-Open No. 2006-345085 discloses that, by printing information indicating a description in relation to an item on a setting information input sheet, even a user with low knowledge relating to an item to be set can easily perform an initial setting of an electronic device.

Typically, setting values of various items of an apparatus can be returned to factory default initial setting values by a user operation. When returning a setting value to the initial setting value in this way, there are cases in which, instead of returning the setting values for all items to the initial setting values, it is possible to select items to return to the initial setting value for each of a group of items, such as network settings or facsimile settings, for example.

However, if an operation to return the above-described setting values to the initial setting values is performed, there is the possibility that an item that has been set once is returned to the factory default initial setting value that goes against the intention of a user. In such a case it is difficult for a user to notice when an item that has been set once has been returned to the factory default initial setting value. In addition, after a setting value has been returned to the factory default initial setting value, there is a necessity to again perform an initial setting similar to when the apparatus was installed to cause the apparatus to perform a desired operation. In such a case, a user must re-set by tracing a menu hierarchy for the item, which is an operation that is cumbersome, and in addition there is a possibility that the apparatus will become unable to execute the desired operation if the setting is performed incorrectly.

SUMMARY OF THE INVENTION

An aspect of the present invention is to eliminate the above-mentioned problems with conventional technology.

A feature of the present invention is to provide a technique for, when any one of a plurality of items corresponding to initialized setting values includes a predetermined item, simplifying resetting of the predetermined item.

According to a first aspect of the present invention, there is provided an information processing apparatus that operates based on setting values of items, comprising: an initializing unit configured to initialize setting values of a plurality of items; a determination unit configured to determine whether or not any one of the plurality of items corresponding to the setting values initialized by the initializing unit includes a predetermined item; and a control unit configured to, if it is determined by the determination unit that any one of the plurality of items corresponding to the setting values initialized by the initializing unit includes the predetermined item, control to perform guidance for setting a setting value of the predetermined item to reset the setting value of the predetermined item.

According to a second aspect of the present invention, there is provided a method of controlling an information processing apparatus that operates based on setting values of items, the method comprising: initializing setting values of a plurality of items; determining whether or not any one of the plurality of items corresponding to the initialized setting values includes a predetermined item; and if it is determined that any one of the plurality of items corresponding to the initialized setting values includes the predetermined item, controlling to perform guidance for setting the setting value of the predetermined item to reset the setting value of the predetermined item.

Further features of the present invention will become apparent from the following description of exemplary embodiments with reference to the attached drawings. Note, in the accompanying drawings, the same reference numerals are added for same or similar configuration elements.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a flowchart for describing operation of the information processing apparatus according to a second embodiment of the present invention.

FIG. 4 is a flowchart for describing operation of the information processing apparatus according to the second embodiment of the present invention.

FIG. 13 depicts a view for describing which category the initialization items illustrated in FIG. 11 according to the embodiments are included in.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

First Embodiment

Figure 1:
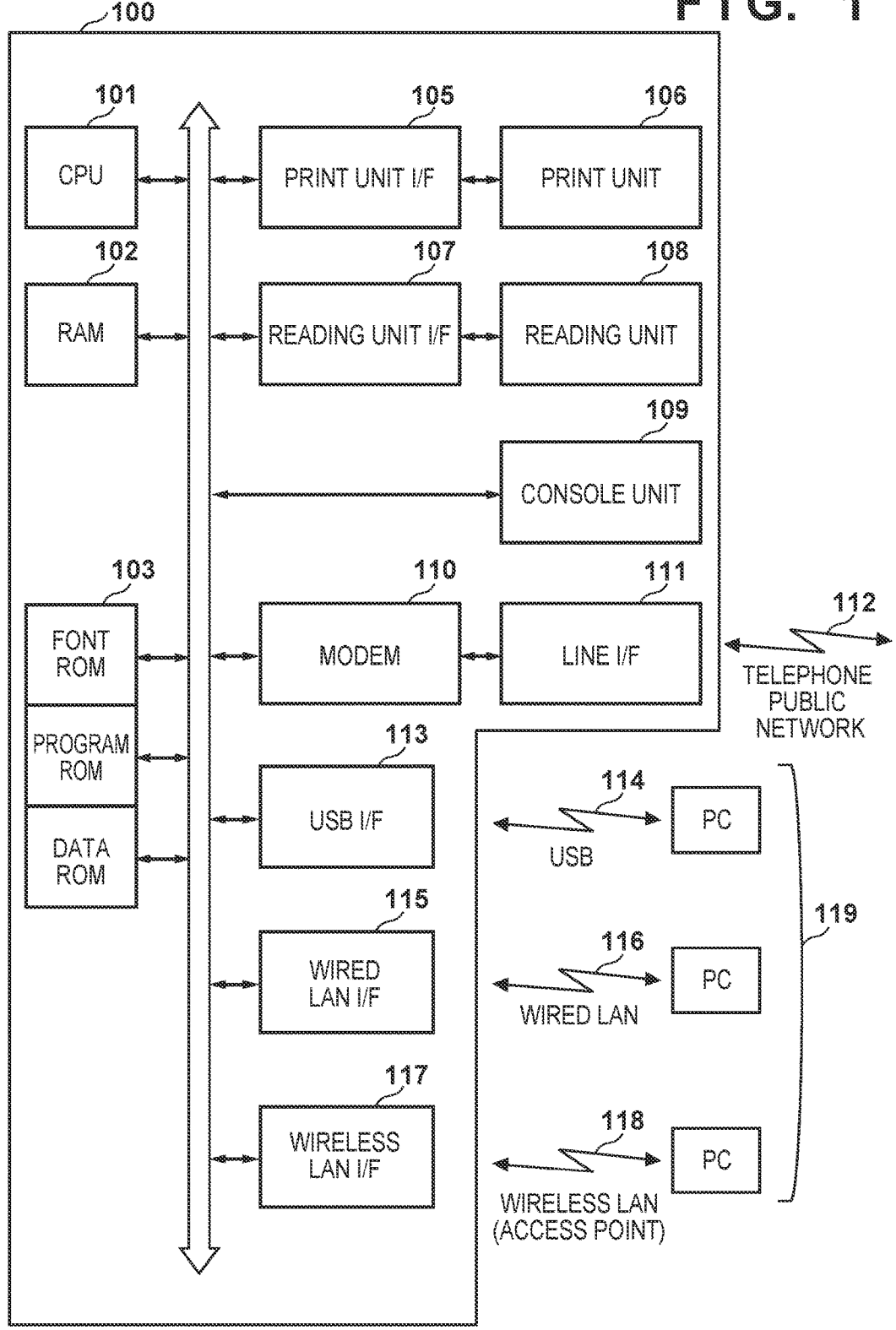
FIG. 1 is a block diagram for describing a configuration of an information processing apparatus according to a first embodiment of the present invention.

FIG. 1 is a block diagram for describing a configuration of an information processing apparatus 100 according to a first embodiment of the present invention.

The information processing apparatus 100 according to the first embodiment is described as a multi-function peripheral (MFP) equipped with a print function, a scan function (a reading function), a facsimile function, or the like. A CPU 101 comprehensively controls the information processing apparatus 100 overall by deploying a program stored in a program ROM of a ROM 103 into a RAM 102, and executing it. Note that this program may be installed in a hard disk drive (HDD) (not shown), and executed by being deployed to the RAM 102 by the CPU 101 at execution time. In addition, a data ROM of the ROM 103 stores apparatus information of the information processing apparatus 100, a user telephone book, department management information, or the like, and these are read by the CPU 101 as necessary. Note that configuration may also be taken such that it is possible to update as necessary the apparatus information, the user telephone book, the department management information, or the like, by having the ROM 103 be a non-volatile storage device such as a flash memory, for example.

A print unit I/F 105 outputs an image signal to a print unit 106 (a printer engine) in accordance with an instruction by the CPU 101. In addition, a reading unit I/F 107 controls a reading unit 108 (a scanner engine) in accordance with an instruction by the CPU 101 to input an image signal obtained by the reading unit 108 reading an original. The CPU 101 can realize copy processing by processing an image signal input via the reading unit I/F 107, and outputting it to the print unit I/F 105 as an image signal for printing. In addition, the CPU 101 uses font information stored in a font ROM of the ROM 103 to display characters, symbols, or the like on a display unit of a console unit 109. In addition, the CPU 101 accepts indication information from the console unit 109, which receives an instruction by a user. Note that the console unit 109 has a touch panel function, detects a user operation performed on a screen of the console unit 109, and conveys it to the CPU 101.

A modem 110 connects to a telephone public network 112 via a line I/F 111, and performs communication processing with another information processing apparatus, a facsimile apparatus, a telephone device, or the like (not shown). A USB I/F 113, a wired LAN I/F 115, and a wireless LAN I/F 117 perform communication processing with PCs 119 via a USB 114, a wired LAN 116, and a wireless LAN (access point) 118, respectively. Note that, in the present embodiment, as an example of an information processing apparatus, description is given of a multi-function peripheral (MFP) equipped with a print function, a scan function (read function), a facsimile function, and the like, but it may be an apparatus not equipped with one of these functions.

Figure 2:
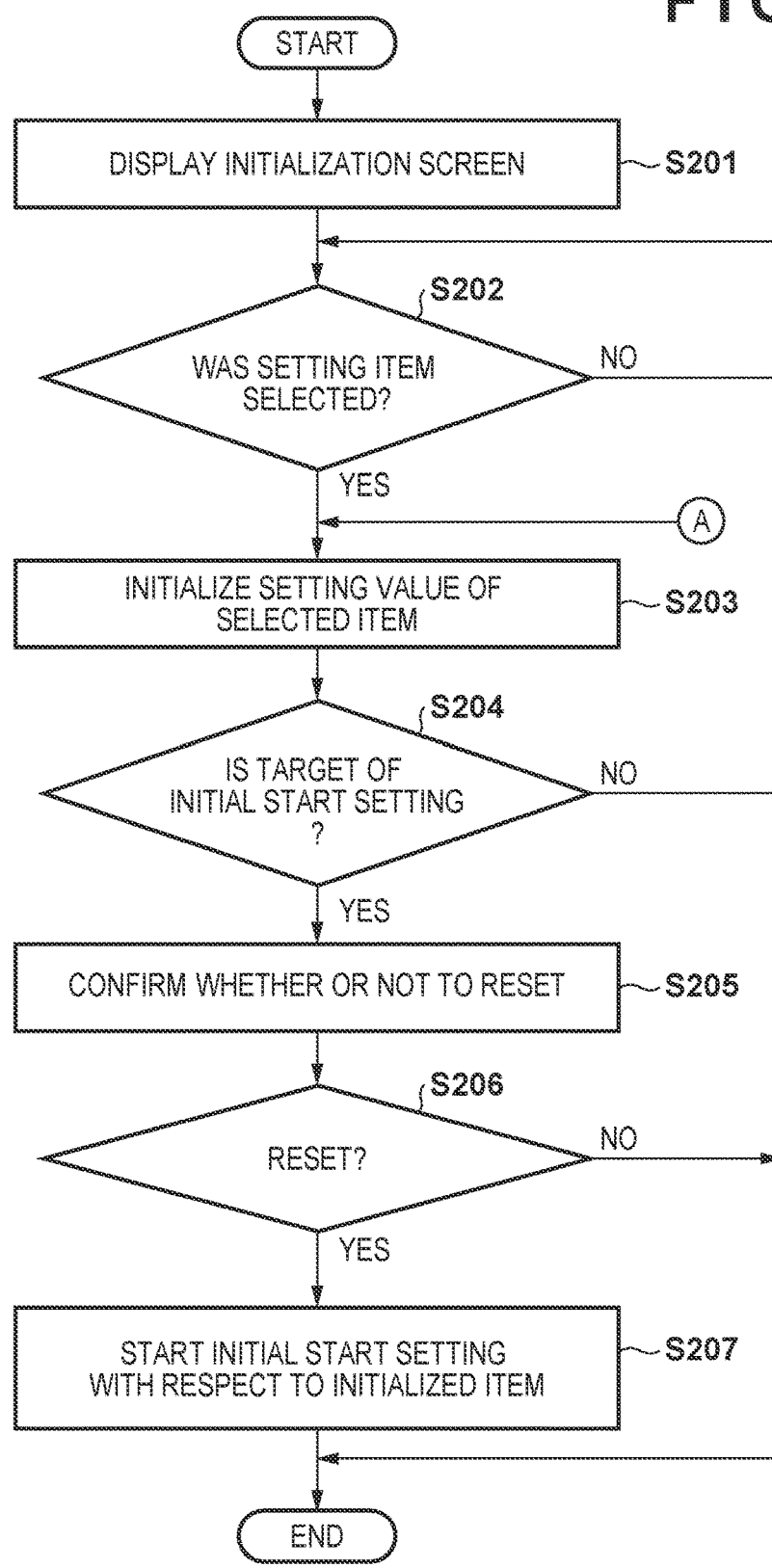
FIG. 2 is a flowchart for describing operation of the information processing apparatus according to the first embodiment.

FIG. 2 is a flowchart for describing operation of the information processing apparatus 100 according to the first embodiment. Note that a program for executing this processing is stored in the program ROM of the ROM 103, and at a time of execution this processing is achieved by the CPU 101 deploying the program to the RAM 102 and executing it.

Figure 11:
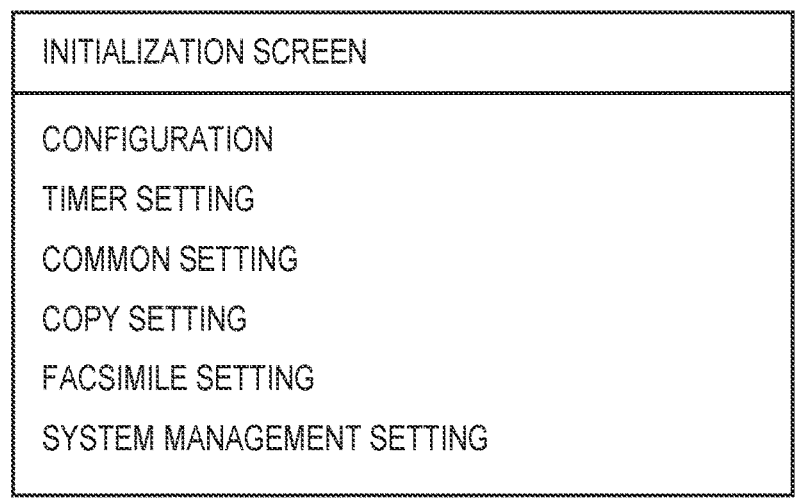
FIG. 11 depicts a view illustrating an example of an initialization screen displayed on a console unit of the information processing apparatus according to the embodiments.

In step S201, the CPU 101 displays an initialization screen as illustrated in FIG. 11, for example, in the console unit 109.

FIG. 11 depicts a view illustrating an example of an initialization screen displayed on the console unit 109 of the information processing apparatus 100 according to embodiments of the present invention.

Here, as a list of items that can become a target of initialization, "configuration", "timer setting", "common setting", "copy setting", "facsimile setting", and "system management setting" are displayed. Here, when one item of these is instructed, the setting value of the instructed item is initialized.

Next, the processing proceeds to step S202, and the CPU 101 waits for one of the displayed items to be selected, upon selection the processing proceeds to step S203, and setting values of the selected item are initialized (cleared).

Figure 12:
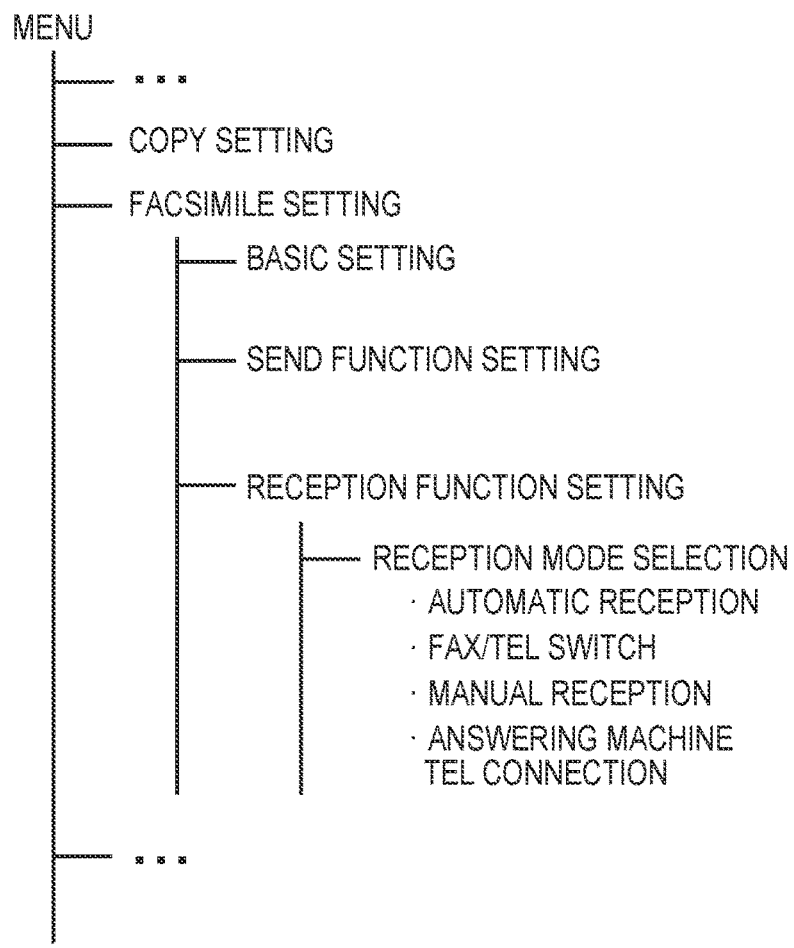
FIG. 12 depicts a view illustrating, by a hierarchy, items of a facsimile setting of the information processing apparatus according to the embodiments.

For example, if "facsimile setting" is selected here, in the hierarchy of setting values in FIG. 12, the items positioned at a lower layer than the facsimile setting, such as "basic setting", "send function setting", and "reception function setting" are all initialized. For the "configuration", "timer setting", "common setting", "copy setting", and "system management setting", which are apart from "facsimile setting", if initialization of a selected setting item is instructed, the setting values of items positioned at a lower layer of the selected setting item are all initialized too.

FIG. 12 depicts a view for illustrating items of the facsimile setting by hierarchy.

Next, the processing proceeds to step S204, and the CPU 101 determines whether or not the item initialized in step S203 includes an item that is a target of an initial start setting. The initial start setting is a setting that should be performed at a time of an initial start after installation of the information processing apparatus 100 to cause the information processing apparatus 100 to operate as the user desires.

Figure 9:
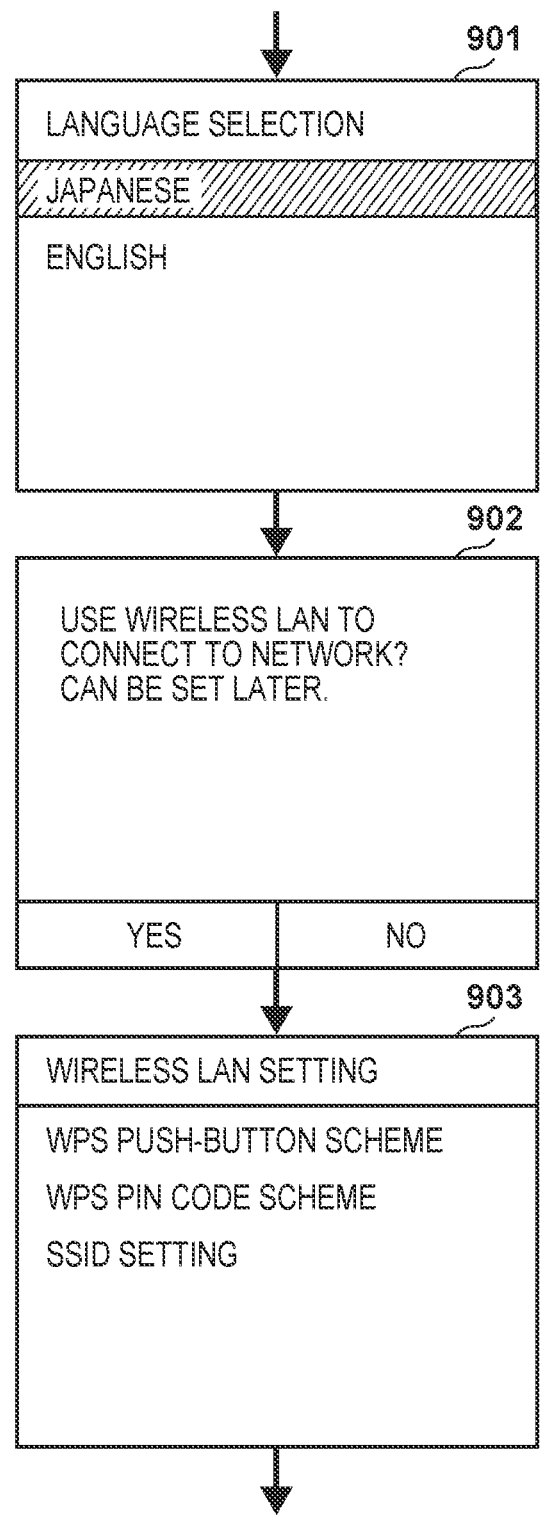
FIG. 9 depicts a view for describing a transition for initial start setting screens displayed when an information processing apparatus according to the embodiments is initially activated.
Figure 10:
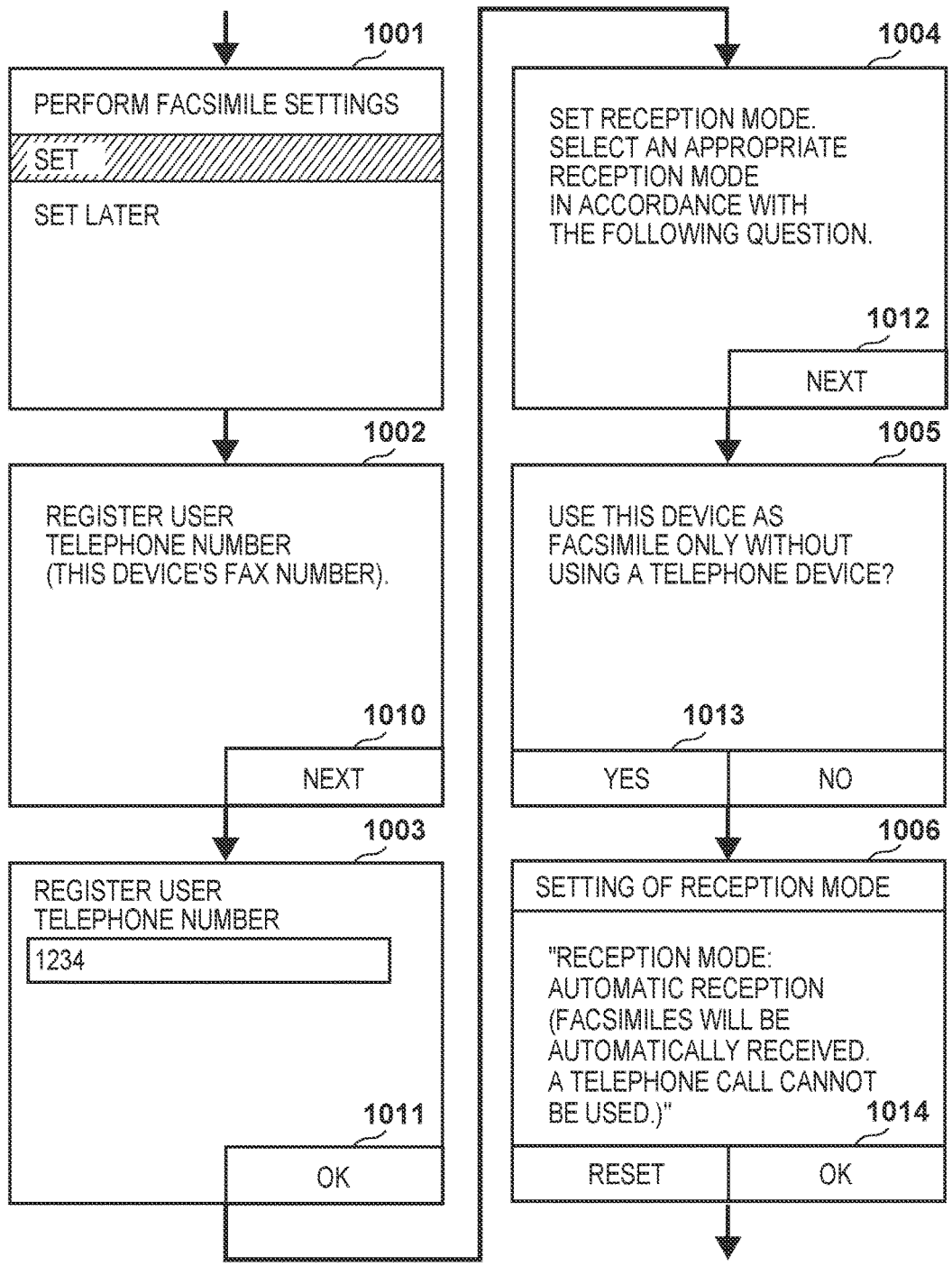
FIG. 10 depicts a view for describing a transition of the setting screens relating to a fax function in the information processing apparatus according to the embodiments.

FIG. 9 and FIG. 10 depict views for describing an example of screen transitions for setting a setting value for each item, when the information processing apparatus 100 is first activated.

FIG. 9 depicts a view for describing a transition for initial start setting screens displayed when the information processing apparatus 100 according to the embodiments is initially activated.

These screens illustrate examples of screens for performing settings necessary to cause the information processing apparatus 100 to operate. In this example, a user can select "Japanese" as the language to be displayed in the console unit 109 by a language selection screen 901, select a wireless LAN setting by a wireless LAN setting screen 902, and perform a wireless LAN setting by a screen 903.

FIG. 10 depicts a view for describing a transition of the setting screens relating to a fax function in the information processing apparatus 100 according to the embodiments. A screen 1001 is displayed after the wireless LAN setting in the screen 903 of FIG. 9 has finished.

When a user selects "set" as the fax setting in the screen 1001, a transition is made to a screen 1002. When a user presses a "next" button 1010 in the screen 1002, a transition is made to a user telephone number registration screen 1003. When a user inputs a telephone number in this screen and presses an OK button 1011, a transition is made to a reception mode setting screen 1004. When a user presses a "next" button 1012 in the screen 1004, an inquiry screen 1005 for whether or not usage is to be by facsimile only without using a telephone device is displayed. When a user presses a "YES" button 1013, a transition is made to a reception mode setting screen 1006. When a user presses an OK button 1014 in the setting screen 1006, the reception mode is set to "automatic reception". In this way, by configuring so that a user can select by a guided dialogue format, it is possible to set a facsimile reception mode, even for a user having no facsimile knowledge.

FIG. 13 depicts a view for describing which category the initialization target items illustrated in FIG. 11, for example, are included in.

In the example of FIG. 13, "screen luminance adjustment", "language selection", and "default screen setting" are included in the category "configuration". In addition, "automatic redial setting", "user telephone number", "reception mode selection", and "source record" are included in "facsimile setting". In addition, "proxy setting" and "wireless LAN setting" are included in "system management setting". "language selection", "user telephone number", "reception mode selection", and "wireless LAN setting" are all targets of an initial start setting. In contrast, "screen luminance adjustment", "default screen setting", "automatic redial", "source record" and "proxy setting" are not targets of an initial start setting. "screen luminance adjustment" is a setting item for adjusting a luminance of a screen displayed in the console unit 109. "language selection" is a setting item for setting a language displayed in the console unit 109. "default screen setting" is a setting item for setting a screen displayed after a power source is turned on. "automatic redial" is a setting item for setting whether or not to execute a redial when communication fails due to an error. "user telephone number" is a setting item for setting a facsimile number of the information processing apparatus 100 itself. "reception mode selection" is a setting item for setting whether to automatically receive a fax without a reception instruction by a user, or whether to wait until a reception instruction by a user is accepted before receiving. "source record" is a setting item for setting whether or not to add information of a transmitter to a header of a fax image. "proxy setting" is a setting item for setting whether or not to perform communication via a proxy server when using the wired LAN 116 or the wireless LAN 118. "wireless LAN setting" is a setting item for setting whether or not to connect to a network by using the wireless LAN. Furthermore, under "wireless LAN setting" are setting items for performing various kinds of setting illustrated in the screen 903. Note that it is assumed that items that are a target of the initial start setting are not included in "timer setting", "copy setting" or "shared setting" illustrated in FIG. 11. Note that the present invention is not limited to this, and an item that is a target of the initial start setting may be included in "timer setting", "copy setting" or "shared setting".

In this way, in step S204, when the CPU 101 determines that the item initialized in step S203 includes the target item of the initial start setting, the processing proceeds to step S205. In step S205, the CPU 101 confirms with a user whether or not to re-set the initialized setting item that is the target of the initial start setting. Meanwhile, if it is determined in step S204 that the item initialized in step S203 does not include the target item of the initial start setting, the processing simply terminates.

In step S205, in the console unit 109, for example a list that the item for which the user has instructed initialization in step S203 includes the target item of the initial start setting is displayed, and a screen (not shown) for inquiring with respect to a user whether or not to perform re-setting of setting values of the item is displayed. In step S206, if a user instructs performing re-setting of the setting values of the item on the screen, the CPU 101 advances the processing to step S207, and if a user does not instruct the re-setting, the CPU 101 terminates this processing. In step S207, the CPU 101 activates a program for performing guidance for the initial start setting with respect to the item initialized in step S203, and enables a user to re-set the setting values of the item via an initial start screen. Note that the program for performing guidance for the initial start setting is stored in the program ROM of the ROM 103.

In step S207, for example a user selects the item "configuration" on the initialization screen of FIG. 11, and if the setting value therefor has been initialized, for example the language selection screen 901 of FIG. 9 is displayed and a user is allowed to perform a language setting. Note that configuration may be taken such that, at this point, even if setting of a language in the screen 901 has completed, the CPU 101 controls so as to not display the setting screens 902 and 903. Accordingly, a user does not need to re-set a setting-value of an item that is not initialized. In addition, for example, when a user selects the item "system management setting" by the initialization screen of FIG. 11 and a setting value therefor is initialized, the wireless LAN setting screens 902 and 903 of FIG. 9 are displayed in step S207. At this point, configuration may be such that the CPU 101 controls so as to display the setting screen 902 without causing the setting screen 901 to be displayed, and accept a wireless LAN setting via the setting screen 902 and the setting screen 903. Accordingly, a user does not need to re-set a setting value of an item that is not initialized. Note that, configuration may be such that, in subsequent embodiments as well, control is performed so as to display only a setting screen for causing setting of a setting value of a setting item that has been initialized, and not display a setting screen for causing setting a setting value of a setting item that was not initialized.

By the first embodiment as described above, it is possible to, when a user initializes a setting value of an item, if the setting value is a target of an initial start setting, display the initial start setting screen for the item again, and allow a user to re-set the setting value for the item. Thus, when a user has initialized a setting value of an item, in a case when there is a desire to return the setting value to a setting value at a time of initialization, it is possible to eliminate effort of a user tracing a menu hierarchy, searching for the initialization screen for the item, and performing a re-setting. In addition, because it is sufficient if a user sets only a setting value of an initialized setting item in accordance with guidance, effort to re-set setting values for setting items that have not been initialized is eliminated.

Second Embodiment

FIG. 3 is a flowchart for describing operation of the information processing apparatus 100 according to a second embodiment of the present invention. Note that a program for executing this processing is stored in the program ROM of the ROM 103, and at a time of execution this processing is achieved by the CPU 101 deploying the program to the RAM 102 and executing it. Note that because a hardware configuration of the information processing apparatus 100 according to the second embodiment is the same as the previously described first embodiment, a description thereof is omitted. Note that this is the same in later-described third through sixth embodiments.

Because step S301 through step S304 of FIG. 3 are the same as the processing of step S201 through step S204 of FIG. 2, description thereof is omitted. In step S304, if the CPU 101 determines that the setting value of the item initialized in step S303 includes a setting value of the target item of the initial start setting, the processing proceeds to step S305, and the CPU 101 sets in the RAM 102 an initial start setting flag in association with the item initialized in step S303, and this processing terminates.

For example, when a user in FIG. 11 has selected "facsimile setting" on the initialization screen and initialized the setting values of the items thereof, in step S305 the CPU 101 sets the initial start setting flag associated with "facsimile setting" in the RAM 102.

FIG. 4 is a flowchart for describing operation of the information processing apparatus 100 according to the second embodiment of the present invention. Note that a program for executing this processing is stored in the program ROM of the ROM 103, and at a time of execution this processing is achieved by the CPU 101 deploying the program to the RAM 102 and executing it.

Firstly, in step S401, the CPU 101 determines whether or not using a specific function has been instructed. Here, when it is determined that using a specific function has been instructed, the processing proceeds to step S402, and the CPU 101 determines whether or not the initial start setting flag corresponding to the function has been set. Here, if the CPU 101 determines that the initial start setting flag corresponding to the function has been set, the processing proceeds to step S403, and the CPU 101 activates a program for performing guidance for an initial start setting that performs an initial setting for a setting value of the function. Thus, via the initial start setting screen, a user can set setting values for various items that are for causing the function to be executed. The processing proceeds to step S404, and the CPU 101 clears the initial start setting flag of the RAM 102, and this processing terminates.

For example, if a user instructs in step S401 to use a fax function, in step S402, if the initial start setting flag associated with the fax function is set, the screen 1001 illustrated in FIG. 10 is displayed. In accordance with user operations, the screens 1002 through 1006 are sequentially displayed on the console unit 109. Thus, a user can easily perform various kinds of setting of the fax function.

By the second embodiment, as described above, when a user initializes a setting value of an item, if the setting value is a target of an initial start setting, the initial start setting screen for the item is displayed again when a function that uses the setting value of the item is instructed. Thus, it is possible to eliminate effort in a user tracing a menu hierarchy, searching for the initialization screen for the item, and performing a re-setting when the user has initialized a setting value of an item and desires to return the setting value to a setting value at a time of initialization.

Third Embodiment

Figure 5:
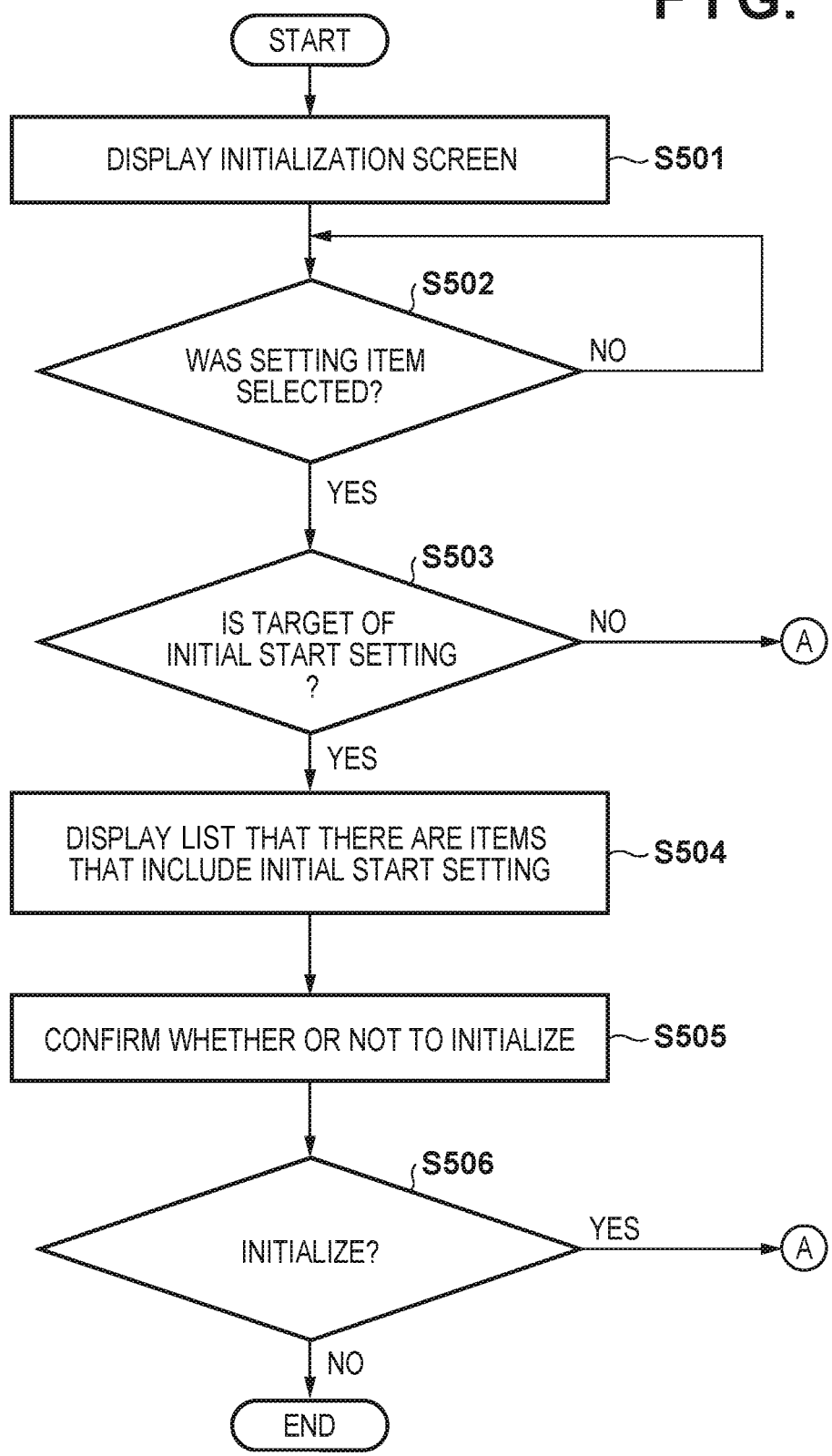
FIG. 5 is a flowchart for describing operation of the information processing apparatus according to a third embodiment of the present invention.

FIG. 5 is a flowchart for describing operation of the information processing apparatus 100 according to a third embodiment of the present invention. Note that a program for executing this processing is stored in the program ROM of the ROM 103, and at a time of execution this processing is achieved by the CPU 101 deploying the program to the RAM 102 and executing it.

Because step S501 through step S503 of FIG. 5 are the same as the processing of step S201, step S202, and step S204 of FIG. 2, description thereof is omitted. In step S503, if the CPU 101 determines that the items initialized in step S502 include a setting item that is the target of the initial start setting, the processing proceeds to step S504, otherwise the processing proceeds to step S203 of FIG. 2. In step S504, the CPU 101 conveys to a user that the items instructed to be initialized in step S502 include a setting item that is the target of the initial start setting, by displaying on the console unit 109. In step S505, the CPU 101 confirms with the user whether or not to initialize the setting value of the item even if it is the target of the initial start setting. In step S506, the CPU 101 determines whether or not the user has selected to initialize, and if the user has decided to initialize the item, processing proceeds to step S203 of FIG. 2, and an initialization process for setting values of the item is executed. In contrast, if the CPU 101 determines in step S506 that the user has not selected the initialization process, the processing terminates without performing the initialization process of the setting values of the item.

By virtue of the third embodiment as described above, when a user instructs initialization of setting values of items, it is determined whether or not the setting values for the items includes a setting value of a setting item that is a target of an initial start setting. If the setting values of the items include a setting value of a setting item that is a target of an initial start setting, before the setting values of the items are initialized, it is possible to confirm with a user whether or not to initialize the setting values. Thus, before initializing setting values of items for which the user has instructed initialization, it is possible for the user to notice whether the setting values of the items are included in the initial start setting.

Fourth Embodiment

Figure 6:
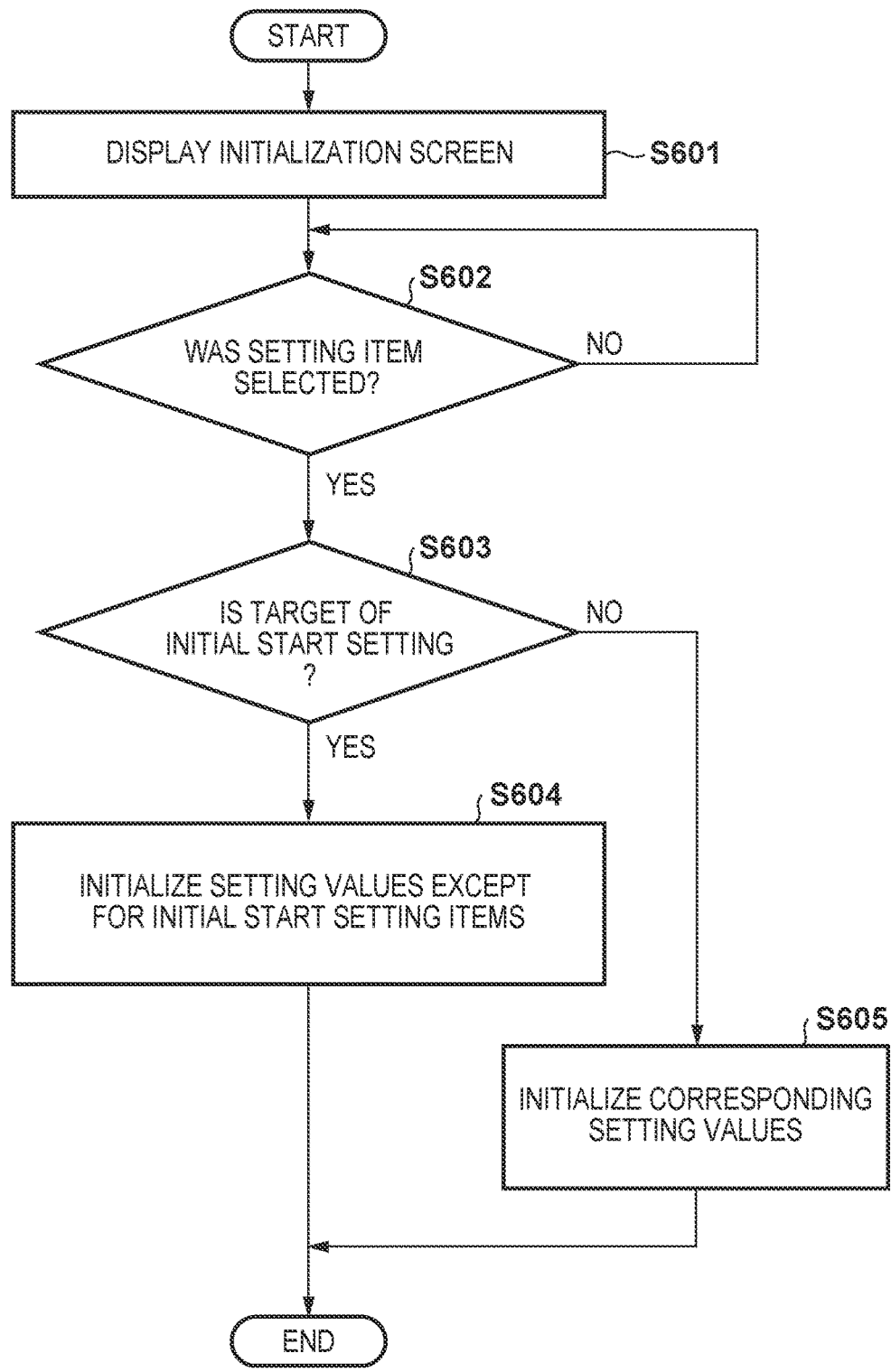
FIG. 6 is a flowchart for describing operation of the information processing apparatus according to a fourth embodiment of the present invention.

FIG. 6 is a flowchart for describing operation of the information processing apparatus 100 according to a fourth embodiment of the present invention. Note that a program for executing this processing is stored in the program ROM of the ROM 103, and at a time of execution this processing is achieved by the CPU 101 deploying the program to the RAM 102 and executing it.

Because step S601 through step S603 of FIG. 6 are the same as the processing of step S201, step S202, and step S204 of FIG. 2, description thereof is omitted. In step S603, if the CPU 101 determines that the items for which initialization was instructed in step S602 include a setting item that is the target of the initial start setting, the processing proceeds to step S604, and the CPU 101 initializes only setting values of items that are not the initial start setting targets, and this processing terminates. In other words, in step S604 the CPU 101 prohibits initialization of setting values of the items that is the target of the initial start setting. In addition, if the CPU 101 determines in step S603 that the items are not the targets of the initial start setting, the processing proceeds to step S605, the setting values of items for which there is an instruction to initialize are initialized, and this processing terminates.

By virtue of the fourth embodiment as described above, when a user instructs initialization of a setting value of an item, if the setting value of the item is the initial start setting target, the setting value of the instructed item is not initialized. Thus, it becomes possible to eliminate effort in which a user performs an initial setting again.

Fifth Embodiment

Figure 7:
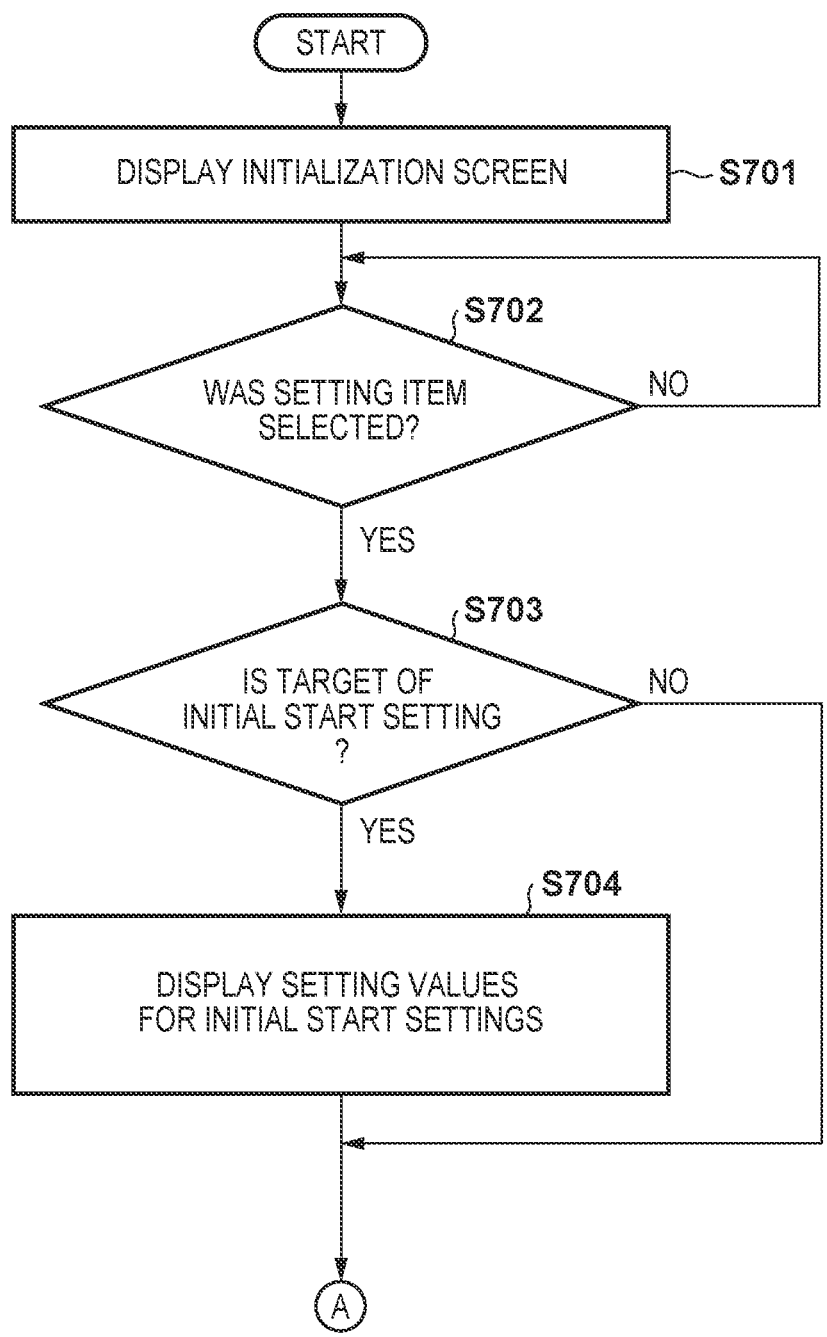
FIG. 7 is a flowchart for describing operation of the information processing apparatus according to a fifth embodiment of the present invention.

FIG. 7 is a flowchart for describing operation of the information processing apparatus 100 according to a fifth embodiment of the present invention. Note that a program for executing this processing is stored in the program ROM of the ROM 103, and at a time of execution this processing is achieved by the CPU 101 deploying the program to the RAM 102 and executing it.

Because step S701 through step S703 of FIG. 7 are the same as the processing of step S201, step S202, and step S204 of FIG. 2, description thereof is omitted. In step S703, if the CPU 101 determines that an item for which there is an instruction to initialize is an item included in the initial start setting, the processing proceeds to step S704. In step S704, before initializing setting values of the item for which there is an instruction, the CPU 101 displays setting values of the initial start setting (current values) of the item on the console unit 109, and the processing proceeds to step S203 of FIG. 2. If the CPU 101 determines in step S703 that the item for which there is an instruction to initialize is not an item included in the initial start setting, the processing proceeds to step S203 of FIG. 2.

By virtue of the fifth embodiment as described above, when a user instructs initialization of setting values of items, if the setting values of the items include a setting value of a setting item that is the initial start setting target, the initial setting value of the instructed item is displayed on the console unit 109. Thus, when a user performs an initial setting again, it is possible for the user to confirm a setting value to reset.

Sixth Embodiment

Figure 8:
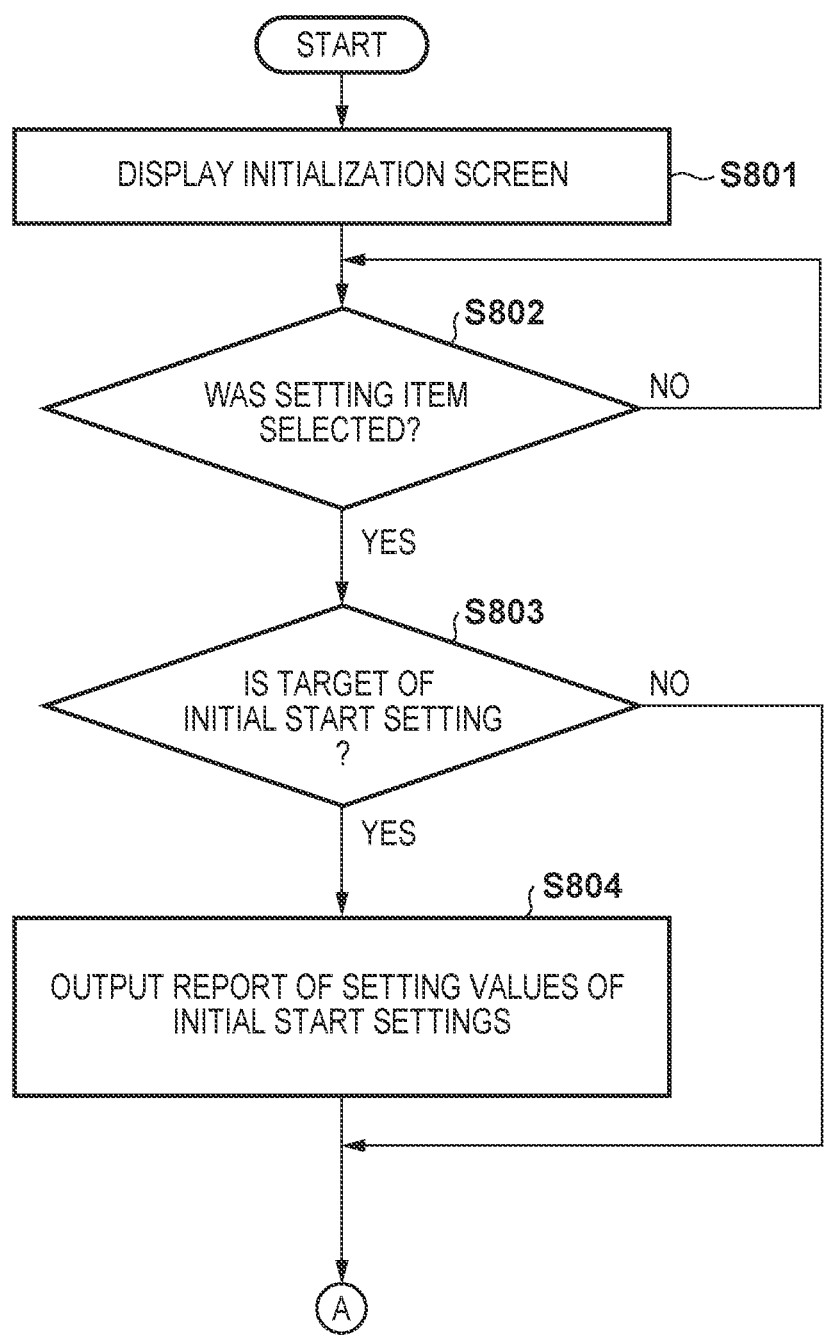
FIG. 8 is a flowchart for describing operation of the information processing apparatus according to a sixth embodiment of the present invention.

FIG. 8 is a flowchart for describing operation of the information processing apparatus 100 according to a sixth embodiment of the present invention. Note that a program for executing this processing is stored in the program ROM of the ROM 103, and at a time of execution this processing is achieved by the CPU 101 deploying the program to the RAM 102 and executing it.

Because step S801 through step S803 of FIG. 8 are the same as the processing of step S201, step S202, and step S204 of FIG. 2, description thereof is omitted. In step S803, if the CPU 101 determines that an item for which there is an instruction to initialize is an item included in the initial start setting, the processing proceeds to step S804. In step S804, before initializing the setting values of the item, the CPU 101 outputs (prints) a report of setting values of an initial start setting (current values) of the item, and the processing proceeds to step S203 of FIG. 2.

By virtue of the sixth embodiment as described above, when a user instructs initialization of setting values of items, if the setting values of the items includes a setting value of a setting item that is the initial start setting target, the initial setting value of the instructed item is printed by the print unit 106. Thus, when a user performs an initial setting again, it is possible for the user to easily confirm a setting value to reset.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-198796, filed Oct. 6, 2015, which is hereby incorporated by reference herein in its entirety.

What is claimed is:

1. An information processing apparatus having a plurality of groups, each group including a plurality of setting items, the information processing apparatus comprising:
  a memory device that stores a set of instructions;
  at least one processor that executes the instructions to function as:
    a selection unit that selects a group including the plurality of setting items in the selected group;
    a clearing unit that clears setting values of the plurality of setting items included in the group selected by the selection unit;
  and
    a display that is capable of displaying a screen for setting a setting value,
      wherein the display displays, in a case where the plurality of setting items includes an initialization setting item that is to be set when the information processing apparatus is initially activated, the screen for setting a setting value of the initialization setting item in accordance with the clearing unit having cleared the setting values of the plurality of setting items, and wherein the display does not display, in a case where the plurality of setting items does not include the initialization setting item that is to be set when the information processing apparatus is initially activated, the screen in accordance with the clearing unit having cleared the setting values of the plurality of setting items.

2. The information processing apparatus according to claim 1, wherein, in a case that the plurality of setting items included in the selected group includes a plurality of initialization setting items, the display sequentially displays screens for setting a setting value of each of the plurality of initialization setting items.

3. The information processing apparatus according to claim 2, wherein the at least one processor executes the instructions in the memory device to function as a reception unit that receives, from a user, a first setting value via a first screen, wherein the display displays a second screen in accordance with the reception unit having received the first setting value.

4. The information processing apparatus according to claim 1, wherein the display displays a setting value before clearing by the clearing unit.

5. The information processing apparatus according to claim 1, wherein the plurality of groups includes a list of settings of functions of the information processing apparatus.

6. The information processing apparatus according to claim 1, wherein the clearing unit clears setting values of all setting items included in the selected group.

7. The information processing apparatus according to claim 1, wherein the clearing unit clears setting values of the plurality of setting items included in the selected group to cause the setting values of the plurality of setting items to set factory default setting values.

8. The information processing apparatus according to claim 1, wherein plurality of groups includes at least one of a configuration setting, a timer setting, a sharing setting, a copy setting, a facsimile setting and a system management setting.

9. The information processing apparatus according to claim 1, further comprising a printer that prints an image on a sheet, wherein the printer prints a setting values before clearing by the clearing unit.

10. The information processing apparatus according to claim 1, wherein the display displays a group selection screen for displaying the plurality of groups and for being capable of selecting the group among the plurality of groups.

11. The information processing apparatus according to claim 1, wherein the at least one processor executes the instructions in the memory device to function as a storage that stores at least an initialization setting item of the information processing apparatus and a group including the initialization setting item.

12. The information processing apparatus according to claim 1, wherein when the information processing apparatus is initially activated is when the information processing apparatus in which all setting values of the plurality of setting items included in each of the plurality of groups are set to factory default settings is initially activated.

13. The information processing apparatus according to claim 1, wherein at least one group of the plurality of groups includes the initialization setting item.

14. The information processing apparatus according to claim 1, wherein the at least one processor executes the instructions in the memory device to function as a confirmation unit that confirms, from a user, whether or not to set a setting value of the initialization setting item in accordance with the clearing unit having cleared a plurality of setting values in a plurality of setting items included in the selected group.

15. The information processing apparatus according to claim 14, wherein the display displays the screen in accordance with the confirmation unit having confirmed that the setting value of the initialization setting item is set by the user.

16. A method of controlling an information processing apparatus having a plurality of groups, each including a plurality of setting items, the method comprising:

selecting a group including the plurality of setting items included in the selected group;

clearing setting values of the plurality of setting items included in the group selected in the selecting; and displaying a screen for setting a setting value, wherein, in the displaying, in a case where the plurality of setting items includes an initialization setting item that is to be set when the information processing apparatus is initially activated, the screen for setting a setting value of the initialization setting item is displayed in accordance with the clearing having cleared the setting values of the plurality of setting items, and wherein, in the displaying, in a case where the plurality of setting items does not include the initialization setting item that is to be set when the information processing apparatus is initially activated, the screen is not displayed in accordance with the clearing having cleared the setting values of the plurality of setting items.

* * * * *